(12) United States Patent
Mishra et al.

(10) Patent No.: US 12,224,918 B2
(45) Date of Patent: Feb. 11, 2025

(54) ALARM TREND DETERMINATION AND NOTIFICATION SYSTEM AND METHOD OF USING

(71) Applicant: Rakuten Mobile, Inc., Tokyo (JP)

(72) Inventors: Abhishek Kumar Mishra, Indore (IN); Nimit Agrawal, Indore (IN); Hemant Gupta, Indore (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/798,310

(22) PCT Filed: Jun. 15, 2022

(86) PCT No.: PCT/US2022/033515
§ 371 (c)(1),
(2) Date: Aug. 9, 2022

(87) PCT Pub. No.: WO2023/244219
PCT Pub. Date: Dec. 21, 2023

(65) Prior Publication Data
US 2024/0187313 A1 Jun. 6, 2024

(51) Int. Cl.
*H04L 41/22* (2022.01)
*H04L 41/0604* (2022.01)

(52) U.S. Cl.
CPC .......... *H04L 41/22* (2013.01); *H04L 41/0604* (2013.01)

(58) Field of Classification Search
CPC .................. H04L 41/22; H04L 41/0604
See application file for complete search history.

(56) References Cited

U.S. PATENT DOCUMENTS

| | | | |
|---|---|---|---|
| 2007/0213922 A1* | 9/2007 | Van Buer | H04W 4/44 701/117 |
| 2015/0254969 A1* | 9/2015 | Bishop | H04L 41/0618 340/506 |
| 2018/0095123 A1* | 4/2018 | Biswas | H02J 13/00002 |
| 2020/0410839 A1* | 12/2020 | Bickel | H02J 3/00125 |
| 2022/0319304 A1* | 10/2022 | Menzel | G08B 27/005 |

* cited by examiner

*Primary Examiner* — Minh Chau Nguyen
(74) *Attorney, Agent, or Firm* — HAUPTMAN HAM, LLP

(57) ABSTRACT

A system for aggregating alarms for a network includes a non-transitory computer readable medium configured to store instructions thereon. The system further includes a processor connected to the non-transitory computer readable medium. The processor is configured to execute the instructions for receiving information for configuring alarm data. The processor is configured to execute the instructions for aggregating alarm data based on the information for configuring alarm data. The processor is configured to execute the instructions for generating a visual representation of the aggregated alarm data. The processor is configured to execute the instructions for instructing a display to display the visual representation on a graphical user interface (GUI). The processor is configured to execute the instructions for receiving filter criteria through the GUI. The processor is configured to execute the instructions for updating the display on the GUI based on the filter criteria.

20 Claims, 11 Drawing Sheets

| Table Name | Alarm_KPI 820 | | | | | | | |
|---|---|---|---|---|---|---|---|---|
| | | 825 | 830 Filters 810 | 835 | 840 850 Sample Data in Database | 855 845 KPI | | 860 |
| Time | Geography Name | Device/Service Type | Device/Service ID Status | Alarm Code | Device/ Service Count | Device/Service Count Due to Planned Activity | Device/Service Count Without Any Planned Activity |
|---|---|---|---|---|---|---|---|
| 10:00 | All | Macro Cell Outage | All | All | 12 | 23 | 2 |
| 10:00 | All | Macro Cell Outage | Inservice | All | 12 | 23 | 2 |
| 10:00 | All | Macro Cell Outage | Readyforservice | All | 12 | 23 | 2 |
| 10:00 | All | Macro Cell Outage | RequestInservice | All | 12 | 23 | 2 |
| 10:00 | All | Macro Cell Outage | Planned | All | 12 | 23 | 2 |
| 10:00 | All | Macro Cell Outage | All | 1055 | 12 | 23 | 2 |
| 10:00 | All | Macro Cell Outage | Inservice | 1055 | 12 | 23 | 2 |
| 10:00 | All | Macro Cell Outage | Readyforservice | 1055 | 12 | 23 | 2 |
| 10:00 | All | Macro Cell Outage | RequestInservice | 1055 | 12 | 23 | 2 |
| 10:00 | All | Macro Cell Outage | Planned | 1055 | 12 | 23 | 2 |
| 10:00 | Geo1 | Macro Cell Outage | All | All | 12 | 23 | 2 |
| 10:00 | Geo1 | Macro Cell Outage | Inservice | All | 12 | 23 | 2 |
| 10:00 | Geo1 | Macro Cell Outage | Readyforservice | All | 12 | 23 | 2 |

| 10:00 | Geo1 | Macro Cell Outage | RequestInservice | All | 12 | 23 | 2 |
| 10:00 | Geo1 | Macro Cell Outage | Planned | All | 12 | 23 | 2 |
| 10:00 | Geo1 | Macro Cell Outage | All | 1055 | 12 | 23 | 2 |
| 10:00 | Geo1 | Macro Cell Outage | Inservice | 1055 | 12 | 23 | 2 |
| 10:00 | Geo1 | Macro Cell Outage | Readyforservice | 1055 | 12 | 23 | 2 |
| 10:00 | Geo1 | Macro Cell Outage | RequestInservice | 1055 | 12 | 23 | 2 |
| 10:00 | Geo1 | Macro Cell Outage | Planned | 1055 | 12 | 23 | 2 |
| 10:05 | All | Macro Cell Outage | Planned | All | 12 | 23 | 2 |
| 10:05 | All | Macro Cell Outage | All | All | 12 | 23 | 2 |
| 10:05 | All | Macro Cell Outage | Inservice | All | 12 | 23 | 2 |
| 10:05 | All | Macro Cell Outage | Readyforservice | All | 12 | 23 | 2 |
| 10:05 | All | Macro Cell Outage | RequestInservice | All | 12 | 23 | 2 |
| 10:05 | All | Macro Cell Outage | Planned | All | 12 | 23 | 2 |
| 10:05 | All | Macro Cell Outage | All | 1055 | 12 | 23 | 2 |
| 10:05 | All | Macro Cell Outage | Inservice | 1055 | 12 | 23 | 2 |
| 10:05 | All | Macro Cell Outage | Readyforservice | 1055 | 12 | 23 | 2 |
| 10:05 | All | Macro Cell Outage | RequestInservice | 1055 | 12 | 23 | 2 |
| 10:05 | All | Macro Cell Outage | Planned | 1055 | 12 | 23 | 2 |
| 10:05 | Geo1 | Macro Cell Outage | All | All | 12 | 23 | 2 |
| 10:05 | Geo1 | Macro Cell Outage | Inservice | All | 12 | 23 | 2 |

FIG. 8 (Continued)

| 10:05 | Geo1 | Macro Cell Outage | Readyforservice | All | 12 | 23 | 2 |
| 10:05 | Geo1 | Macro Cell Outage | RequestInservice | All | 12 | 23 | 2 |
| 10:05 | Geo1 | Macro Cell Outage | Planned | All | 12 | 23 | 2 |
| 10:05 | Geo1 | Macro Cell Outage | All | 1055 | 12 | 23 | 2 |
| 10:05 | Geo1 | Macro Cell Outage | Inservice | 1055 | 12 | 23 | 2 |
| 10:05 | Geo1 | Macro Cell Outage | Readyforservice | 1055 | 12 | 23 | 2 |
| 10:05 | Geo1 | Macro Cell Outage | RequestInservice | 1055 | 12 | 23 | 2 |

**FIG. 8
(Continued)**

ALARM TREND DETERMINATION AND NOTIFICATION SYSTEM AND METHOD OF USING

RELATED APPLICATIONS

The present application is a National Phase of International Application No. PCT/US2022/033515, filed Jun. 15, 2022.

FIELD

This description relates to an alarm trend determination and notification system and a method of using the same.

BACKGROUND

Electronic systems, such as telecommunication systems, experience errors and problems during operation. These errors and problems result in the generation of alarms within the electronic system. The alarms include information related to the component experiencing the error or problem, the type of error or problem experienced, a time that the error or problem occurred, or other suitable information. In some approaches, in order to determine trends for errors or problems within the electronic system, tables of alarm data were generated and system managers would analyze the tables to attempt to identify patterns and outlier errors and problems. As electronic systems become more complex and include a greater number of components, an amount of time consumed by this manual analysis increases rapidly.

SUMMARY

An aspect of this description relates to a system for aggregating alarms for a network. The system includes a non-transitory computer readable medium configured to store instructions thereon. The system further includes a processor connected to the non-transitory computer readable medium. The processor is configured to execute the instructions for receiving information for configuring alarm data. The processor is configured to execute the instructions for aggregating alarm data based on the information for configuring alarm data. The processor is configured to execute the instructions for generating a visual representation of the aggregated alarm data. The processor is configured to execute the instructions for instructing a display to display the visual representation on a graphical user interface (GUI). The processor is configured to execute the instructions for receiving filter criteria through the GUI. The processor is configured to execute the instructions for updating the display on the GUI based on the filter criteria. In some embodiments, the processor is further configured to execute the instructions for generating the visual representation including aggregate alarm data from a current day and aggregated alarm data prior to the current day. In some embodiments, the processor is further configured to execute the instructions for automatically generating a notification in response to a different between aggregated alarm data for a first time of the current day and aggregated alarm data for a second time prior to the current day exceeding a threshold. In some embodiments, the processor is further configured to execute the instructions for aggregating the alarm data based on a time frame, wherein every alarm that is pending during the time frame and satisfies the information for configuring alarm data is aggregated. In some embodiments, the processor is further configured to execute the instructions for generating the visual representation including at least one graph and at least one table. In some embodiments, the processor is further configured to execute the instructions for receiving information for configuring alarm data including at least one of geography information, alarm code information, equipment type information, equipment status information, or planned event information. In some embodiments, the processor is further configured to execute the instructions for storing the aggregated alarm data in a cloud storage.

An aspect of this description relates to a method of aggregating alarms for a network. The method includes receiving information for configuring alarm data. The method further includes aggregating alarm data based on the information for configuring alarm data. The method further includes generating a visual representation of the aggregated alarm data. The method further includes displaying the visual representation on a graphical user interface (GUI). The method further includes receiving filter criteria through the GUI. The method further includes updating the display on the GUI based on the filter criteria. In some embodiments, generating the visual representation includes generating the visual representation including aggregate alarm data from a current day and aggregated alarm data prior to the current day. In some embodiments, the method further includes automatically generating a notification in response to a different between aggregated alarm data for a first time of the current day and aggregated alarm data for a second time prior to the current day exceeding a threshold. In some embodiments, aggregating the alarm data includes aggregating the alarm data based on a time frame, wherein every alarm that is pending during the time frame and satisfies the information for configuring alarm data is aggregated. In some embodiments, generating the visual representation includes generating the visual representation including at least one graph and at least one table. In some embodiments, receiving information for configuring alarm data includes receiving at least one of geography information, alarm code information, equipment type information, equipment status information, or planned event information. In some embodiments, the method further includes storing the aggregated alarm data in a cloud storage.

An aspect of this description relates to a non-transitory computer readable medium for storing instructions thereon. When executed by a processor, the instructions cause the processor to receive information for configuring alarm data. When executed by the processor, the instructions further cause the processor to aggregate alarm data based on the information for configuring alarm data. When executed by the processor, the instructions further cause the processor to generate a visual representation of the aggregated alarm data. When executed by the processor, the instructions further cause the processor to instruct a display to display the visual representation on a graphical user interface (GUI). When executed by the processor, the instructions further cause the processor to receive filter criteria through the GUI. When executed by the processor, the instructions further cause the processor to update the display on the GUI based on the filter criteria. In some embodiments, the instructions are further configured to cause the processor to generate the visual representation including aggregate alarm data from a current day and aggregated alarm data prior to the current day. In some embodiments, the instructions are further configured to cause the processor to automatically generate a notification in response to a different between aggregated alarm data for a first time of the current day and aggregated alarm data for a second time prior to the current day exceeding a threshold. In some embodiments, the instructions are further configured to cause the processor to aggregate the alarm data based on a time frame, wherein every alarm that is pending during the time frame and satisfies the information for configuring alarm data is aggregated. In some embodiments, the instructions are further configured to cause the processor to receive information for configuring alarm data comprising at least one of geography information, alarm code information, equipment type information, equipment status information, or planned event information. In some embodiments, the instructions are further configured to cause the processor to store the aggregated alarm data in a cloud storage.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 8 is a view of a table of tracked alarm data in accordance with some embodiments.

DETAILED DESCRIPTION

Figure 1:
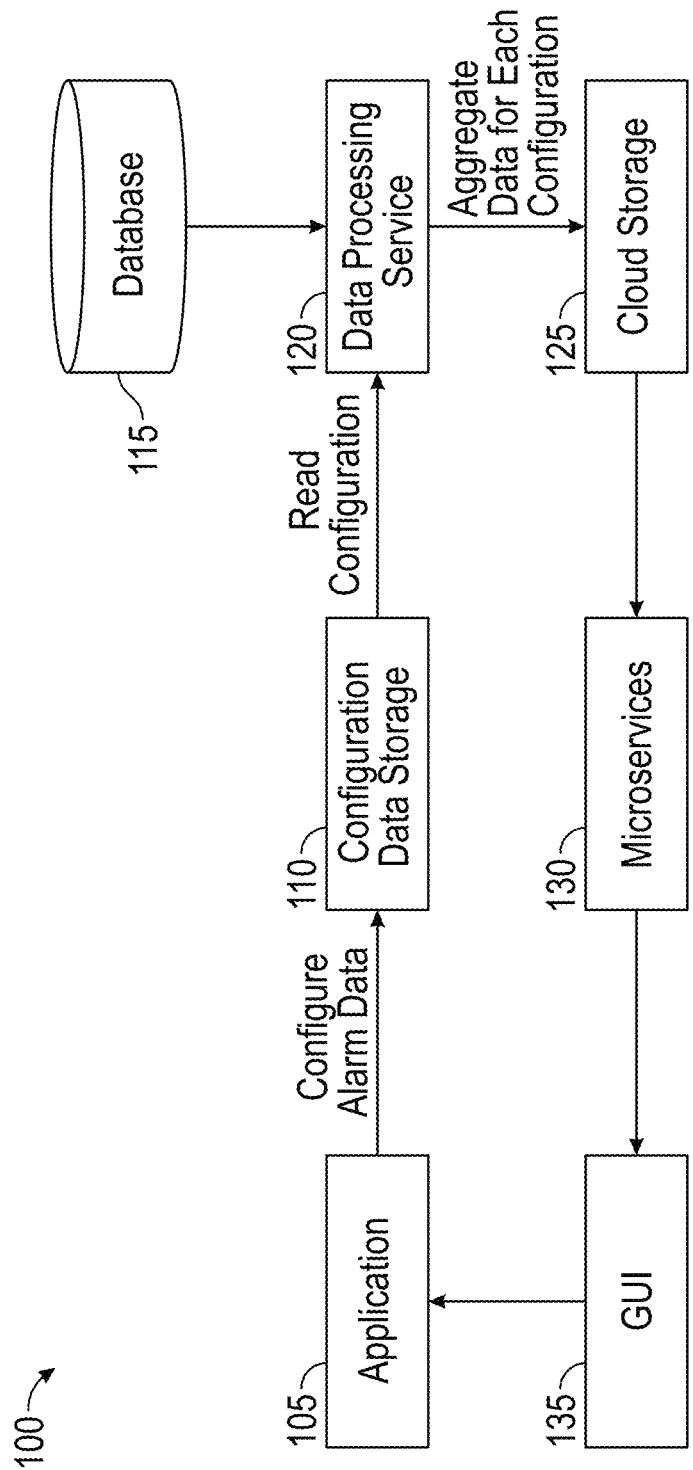
FIG. 1 is an operational view of an alarm trend determination and notification system in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In order to determine a health of a network, such as a telecommunication network, network managers often track alarms. Alarms are generated when a component of the network experiences a problem or error. A type and number of alarms within a network, as well as the location of the component that generated the alarm helps to determine whether the network is functioning properly and providing service at an acceptable level. One of the tools used when monitoring alarms is to determine a trend of the alarms generated and to compare the alarm data with alarm data from a previous period, such as a previous day or a previous week. However, in some approaches, the alarm data is merely tabulated and network managers are forced to manually review the tabulated alarm data to determine trends in the alarm data. In the tabulated alarm data approach, alarm data from all types of alarm codes, component types, domains, etc. are compiled together. This huge amount of information complicates analysis of the tabulated alarm data, making trend identification more difficult.

In contrast with the tabulated alarm data approach, the current description includes a system configured to receive alarm data configuration information from the network manager. The alarm data configuration information allows the network manager to see only alarm data that is assists with monitoring and maintaining the network. For example, alarm data from components that are not currently in service is able to be omitted. Based on the alarm data configuration information, the system is able to receive and process alarm data and display relevant alarm data in a format that permit easier trench identification in comparison with the tabulated alarm data approach. The easier identification of trends helps the network manager to determine whether repairs or replacement of components of the network is advisable to maintain a health of the network. For example, in response to seeing a spike in alarms in a certain geographic area, the network manager is able to determine whether to provide instructions to a maintenance crew to repair or replace components in that geographic area. Alternatively, the network manager is able to determine whether a power outage in the geographic area is impacting the performance of the network. Without an ability to readily determine trends in the alarm data, inefficiency in network management increases, such as dispatching a maintenance crew when no maintenance is recommended, and an overall health of the network is not able to be accurately determined, such as failing to identify a cluster of alarms within the geographic area in a timely manner.

In some embodiments, the system is able to provide notifications to the network manager in response to determining that the alarm trend data deviates significantly from the alarm data from a previous time period. In some embodiments, the system permits the network manager to selectively adjust the alarm data configuration information to tailor the alarm data monitored as the network changes over time. These abilities help the network manager to maintain the network in an acceptable level of performance in order to meet customer expectations.

Figure 9:
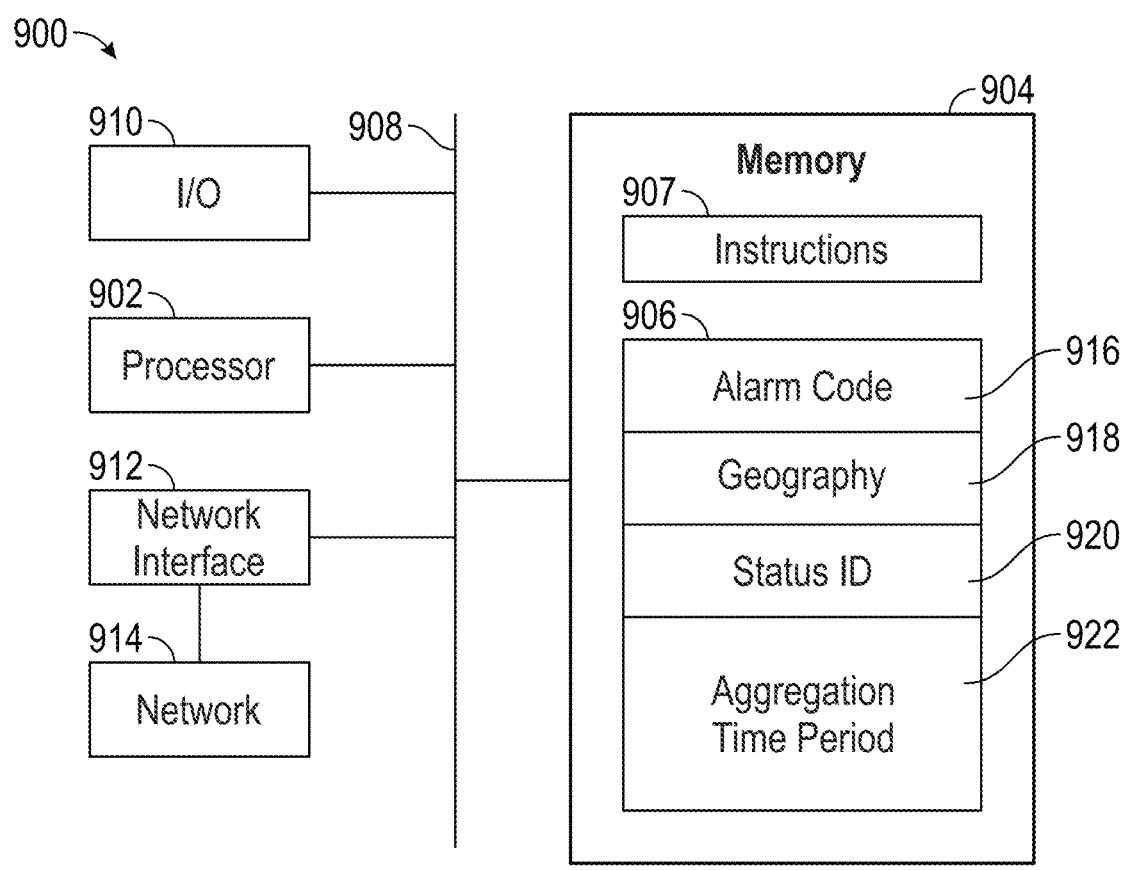
FIG. 9 is a schematic view of an alarm trend determination and notification system in accordance with some embodiments.

FIG. 1 is an operational view of an alarm trend determination and notification system 100 in accordance with some embodiments. In some embodiments, one or more operations of the alarm trend determination and notification system 100, also called system 100, is implemented using a system 900 (FIG. 9). In some embodiments, the system 100 is usable to produce one or more of the graphical user interfaces (GUIs) of a GUI 200 (FIG. 2), a GUI 300 (FIG. 3), a GUI 500 (FIG. 5), a GUI 600 (FIG. 6), a GUI 700 (FIG. 7), a table 800 (FIG. 8), or other suitable GUIs.

The system 100 includes an application 105 configured to receive alarm data configuration information from a network manager. The alarm data configuration information is stored in a configuration data storage 110. A database 115 is configured to store alarm data received from the network. A data processing service 120 reads the alarm data configuration information from the configuration data storage 110 and alarm data from the database 115. The data processing service 120 is configured to aggregate the alarm data from the database 115 based on the alarm data configuration information from the configuration data storage 110. The aggregated alarm data is then stored in a cloud storage 125. The stored data from the cloud storage 125 is then processed by microservices 130 of the system to generate one or more GUI 135 viewable by the network manager. The network manager is able to modify or generate new alarm data configuration information using the GUI 135, which is transmitted by the application 105 to the configuration data storage 110 for future aggregation operations by the data processing service 120.

The application 105 is configured to receive information from the network manager related to alarm data deemed relevant for monitoring the network. In some embodiments, the application 105 includes a GUI for receiving the information from the network manager. In some embodiments, the GUI for the application 105 is displayed on a monitor. In some embodiments, the GUI for the application 105 is displayed on a mobile device, such as a smart phone, tablet, or other suitable mobile device. In some embodiments, the GUI includes fields for receiving alphanumeric information from the network manager. In some embodiments, the GUI includes drop down menu with available options for different criteria selectable by the network manager. In some embodiments, the available options for the drop down menus are automatically populated based on component information for the network available to the system 100. For example, in some embodiments, information such as alarm codes, component type, component location, domain information, or other suitable information, is known by the system 100 based on an inventory database accessible by the system 100. The system 100 is able to use this information to populate the drop down menus. In some embodiments, the system 100 is able to compare received alphanumeric information from the network manager with information in the inventory database to determine whether the received alphanumeric information is valid for the network. The network manager is able to enter information in one or more fields of the application 105 in order to set criteria for aggregation of the alarm data. In some embodiments, the information for the fields of the application 105 is determined based on a scope of a work order for the network manager. In some embodiments, the information for the fields of the application 105 is determined based on empirical data from past operations of the network. In some embodiments, the information for the fields of the application 105 is determined based on an experience of the network manager with respect to the network. Once the application 105 has received the information for aggregating alarm data, called alarm data configuration information, the information is transferred to the configuration data storage 110. In some embodiments, the network manager is requested to confirm completion of data entry. In some embodiments, the alarm data configuration information is transmitted wirelessly to the configuration data storage 110. In some embodiments, the alarm data configuration information is transmitted via a wired connection to the configuration data storage 110.

The configuration data storage 110 is configured to store alarm data configuration information received from the application 105. In some embodiments, the configuration data storage 110 includes a non-volatile memory. In some embodiments, the configuration data storage 110 includes random access memory (RAM), such as dynamic RAM (DRAM), resistive RAM (RRAM), or another suitable type of memory. In some embodiments, the configuration data storage 110 include a cloud-based storage. The configuration data storage 110 is configured to store the alarm data configuration information received from the application 105 for further use in aggregating alarm data by the system 100. In some embodiments, the configuration data storage 110 is integrated into a same device as the application 105. In some embodiments, the configuration data storage 110 is part of a separate device from that including the application 105.

The database 115 is configured to receive alarm data from the network. In some embodiments, the database 115 includes a non-volatile memory. In some embodiments, the database 115 includes random access memory (RAM), such as dynamic RAM (DRAM), resistive RAM (RRAM), or another suitable type of memory. In some embodiments, the database 115 include a cloud-based storage. In some embodiments, the database 115 includes a same type of memory as the configuration data storage 110. In some embodiments, the database 115 includes a different type of memory from the configuration data storage 110. In some embodiments, the database 115 is integrated into a same device as the configuration data storage 110. In some embodiments, the database 115 is part of a device different from the configuration data storage 110. In some embodiments, the alarm data includes an alarm code indicating a problem or error experienced by the component. In some embodiments, the alarm data further includes information about the component experiencing the problem or error, such as serial number, location information, domain information, or other suitable information. In some embodiments, the component information includes only identification information for the component; and the database 115 is configured to receive other information, such as domain and location, related to the component from an inventory database (not shown).

The data processing service 120 is configured to receive alarm data from the database 115 and alarm data configuration information from the configuration data storage 110. The data processing service 120 is configured to aggregate the alarm data based on the alarm data configuration information in order to collect the data requested by the network manager using the application 105. The data processing service 120 is configured to aggregate alarms which satisfy one or more of the criteria from the alarm data configuration information; and are pending within a set time frame. The time frame is a period of time sufficient to gather alarm data a process the alarm data. In some embodiments, the time frame is set by the network manager. In some embodiments, the time frame is recommended by the system 100 based on a number of alarms received by the system. In some embodiments, the time frame ranges from about 5 minutes to about 60 minutes. If the time frame is too long, then an amount of time for gather alarm data from the database 115 becomes too high for the system 100 to function properly, in some instances. If the time frame is too short, then an amount of time for processing the alarm data after gathering is insufficient to complete processing before the gather of the alarm data for a next subsequent time frame begins, in some instances. In some embodiments, the alarms pending within the time frame are called an alarm data batch. In some embodiments, the system 100 is configured to generate an alert in response to a failure to complete processing of an alarm data batch within the time frame corresponding to the alarm data batch. In some embodiments, the alert includes an audio or visual alert. In some embodiments, the alert includes a recommendation to lengthen the time frame. In some embodiments, the alert includes a request to review alarm data configuration information and remove configurations that are no long in use. In some embodiments, the alert is transmitted to a mobile device accessible by the network manager. In some embodiments, the alert is transmitted wirelessly. In some embodiments, the alert is transmitted via a wired connection. Details with respect to aggregation during a time frame are described below with respect to FIG. 4, in accordance with some embodiments. In some embodiments, the data processing service 120 is configured to generate one or more tables based on the aggregated alarm data for each configuration. In some embodiments, the data processing service 120 is configured to generated one or more graphical representations based on the aggregated alarm data for each configuration.

The cloud storage 125 is configured to store the aggregated data from the data processing service 120. The use of cloud storage 125 in the system 100 for the aggregated data is due to the large size of the data to be stored. In some embodiments, the cloud storage 125 is integrated into a same device as at least one of the configuration data storage 110 or the database 115. In some embodiments, the cloud storage 125 is part of a different device from each of the configuration data storage 110 and the database 115. In some embodiments, the cloud storage 125 is configured to store the aggregated alarm data from the data processing service 120 until instructed to remove the data by the network manager. In some embodiments, the cloud storage 125 is configured to automatically delete or permit overwriting of aggregated alarm data from the data processing service 120 after a set comparison time frame. The comparison time frame is a time period over which the aggregated alarm data is compared with past aggregated alarm data to determine trends or changes in performance of the network. In some embodiments, the comparison time frame is set by the network manager. In some embodiments, the comparison time frame is recommended by the system 100 based on an amount of available storage space in the cloud storage 125 and the amount of aggregated alarm data generated each day by the data processing service 120. The amount of aggregated alarm data generated each day by the data processing service 120 is based on an amount of alarm data in the database 115 and a number of different configurations within the configuration data storage 110. In some embodiments, the comparison time frame ranges from two days to one week, where the two days includes a current day and a previous day. If the comparison time frame is too short, identification of trends in the aggregated alarm data is hindered due to lack of data available for comparison, in some instances. If the comparison time frame is too long, use of resources within the cloud storage 125 is inefficient, in some instances.

The microservices 130 are configured to retrieve the aggregated alarm data from the cloud storage 125 and generate visual representations of the aggregated alarm data. In some embodiments, the microservices 130 are configured to generate one or more graphical representations. In some embodiments, the microservices 130 are configured to generate one or more tables. The microservices 130 generate the visual representations based on a desired design of the GUI 135. In some embodiments, the desired design of the GUI 135 is based on information received from the network manager, e.g., by the application 105. In some embodiments, the desired design of the GUI 135 is based on a stored layout of the GUI 135 based on network manager interacting with the GUI 135.

The GUI 135 is configured to display the visual representations generated by the microservices 130. The GUI 135 permits the network manager to interact with information being displayed in order to provide additional details related to alarm data. The GUI 135 is also configured to receive information from the network manager to refine or update the desired design of the GUI 135. In some embodiments, the GUI 135 is configured to receive information from the network manager for generating one or more new alarm data configurations. That is, in some embodiments, the functionality of the application 105 is integrated into the GUI 135. Details of the GUI 135 are described below with respect to FIGS. 5-8, in accordance with some embodiments.

Using the GUI 135 the network manager is able to easily identify trends in alarm data without manually sorting through huge volumes of raw alarm data. Additionally, in some embodiments, the system 100 is able to generate a notification in response to a trend in the alarm data. For example, in some embodiments, the system 100 is configured to generate a notification in response to current aggregated alarm data being different from alarm data from the comparison time frame by a threshold value. In some embodiments, the threshold value ranges from two standard deviations to six standard deviations. In some embodiments, the threshold value ranges from a 50% difference to a 200% different. If the threshold value is too low, then a risk of overwhelming the network manager with notifications increases, in some instances. If the threshold value is too high, then a risk of failing to identify a trend increases, in some instances. In some embodiments, the notification includes an audio or visual notification. In some embodiments, the notification is transmitted to a mobile device accessible by the network manager. In some embodiments, the notification is transmitted wirelessly. In some embodiments, the notification is transmitted via wired connection.

Figure 2:
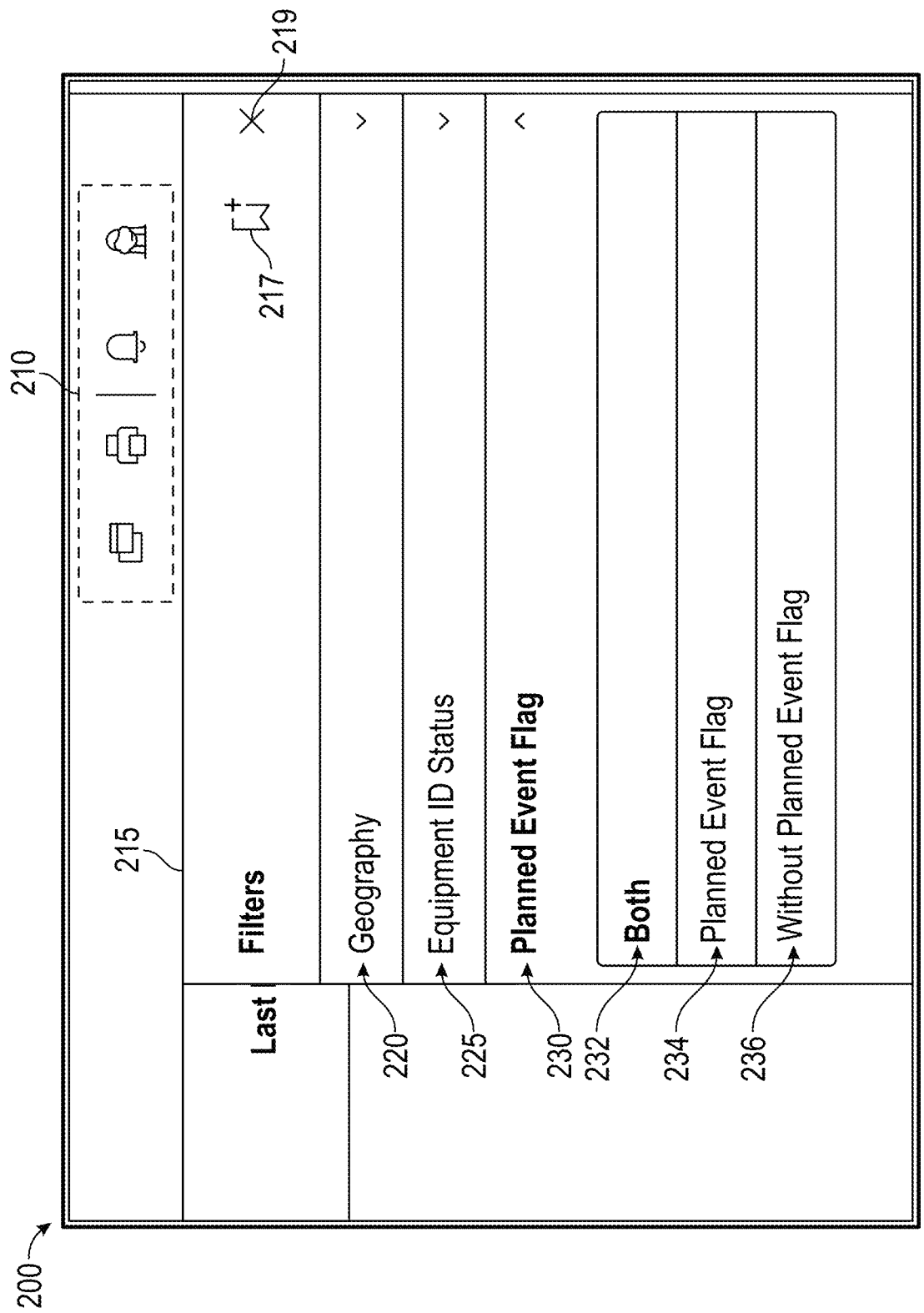
FIG. 2 is a view of a graphic user interface (GUI) for configuring tracked alarm data in accordance with some embodiments.

FIG. 2 is a view of a GUI 200 for configuring tracked alarm data in accordance with some embodiments. In some embodiments, the GUI 200 is generated using the system 100 (FIG. 1), the system 900 (FIG. 9), or another suitable system. In some embodiments, the GUI 200 is usable to receive alarm data configuration information, such as through application 105 (FIG. 1). In some embodiments, the GUI 200 is part of the GUI 135 (FIG. 1).

The GUI 200 includes operational icons 210 and filters 215. The operational icons 210 allow the network manager to implement functionalities of the GUI 200 other than inputting alarm data configuration information. The filters 215 permit the network manager to enter criteria related to alarm data configuration information.

The operational icons 210 are not specific to alarm data configuration, but are usable to implement functionality of the GUI 200. In some embodiments, the operational icons 210 include icons for implementing accessing of account information for the network manager; controlling notifications; printing information from the GUI 200; copying information from the GUI 200; or other functionalities of the GUI 200. In some embodiments, the operational icons 210 displayed in the GUI 200 are adjustable, so that the network manager is able to select which, if any, operational icons 210 are pinned to be displayed by the GUI 200.

The filters 215 is a window for displaying criteria for setting alarm data configuration information. The filters 215 include a bookmark icon 217 for bookmarking the criteria being set. Bookmarking the criteria helps to allow the network manager to locate the filter combination being set for later updating or deletion of the filter combination. The filters 215 further include a close icon 219 for closing the filters 215. In some embodiments, the GUI 200 is configured to prompt the network manager to save any modifications to the filter combinations entered prior to closing the filters 215. In some embodiments, the prompt includes an audio or visual prompt.

The filters 215 further include a geography filter 220, an equipment ID status filter 225 and a planned even flag filter 230. In some embodiments, the filters 215 include additional filters from those included in FIG. 2. In some embodiment, at least one of the filters in the filters 215 is omitted or replaced with a different filter from those included in FIG. 2. One of ordinary skill in the art would understand that this description is not limited to solely the filters included in FIG. 2. Each of the geography filter 220, the equipment ID status 225, and the planned event flag filter 230 include a drop down menu to permit selection options for each of the filters. In some embodiments, at least one of the geography filter 220, the equipment ID status filter, or the planned event flag filter 230 is able to receive alphanumeric information. In some embodiments, the drop down menus of the filters 215 are automatically populated by the GUI 200 based on available options for the network. In some embodiments, the available options for the network are determined based on an inventory database (not shown).

The geography filter 220 is usable to select specific geographic locations of components generating alarms. In some embodiments, the geography filter 220 is usable to identify specific cell tower locations, groups of cell towers, or other geographic regions. In some embodiments, the network manager permitted to select a single geographic location from the geography filter 220. In some embodiments, the network manager is able to select multiple geographic locations from the geography filter 220. Using the geography filter 220, the network manager is able to selectively monitor portions of the network without becoming overwhelmed by a number of alarms across an entirety of the network.

The equipment ID status filter 225 is usable to select specific status conditions for components generating alarms. In some embodiments, the equipment ID status filter 225 is usable to identify whether the component is currently in use, planned to be used, disconnected, ready for use, or other status identifiers. In some embodiments, the network manager permitted to select a single equipment ID status from the equipment ID status filter 225. In some embodiments, the network manager is able to select multiple statuses from the equipment ID status filter 225. Using the equipment ID status filter 225, the network manager is able to selectively monitor portions only components that have a desired status. For example, in some embodiments, the network manager desires to monitor only components that are currently in service, i.e., currently providing functionality of the network. In such a situation, the network manager is able to use the equipment status ID filter 225 to limit the alarm data configuration information to only those components that are in service.

The planned event flag filter 230 is usable to select whether alarms are expected for components of the network. A planned event includes repair, replacement, upgrading or other service to a component of the network. Servicing a component is likely to produce alarms as the service is performed on the component. In some embodiments, the planned event flag filter 230 is usable to identify whether the component is part of a planned event, not part of a planned event, or both. In some embodiments, the information related to planned events is stored in the inventory database accessible by the GUI 200. Using the planned event flag filter 230, the network manager is able to selectively exclude components from monitoring based on whether servicing of the component is anticipated. For example, in some embodiments, the network manager desires to monitor only components that are without a planned event flag, indicating that any generated alarm is not expected. In such a situation, the network manager is able to use the planned event flag filter 230 to limit the alarm data configuration information to only those components that are without a planned event flag.

A drop down menu for the planned event flag filter 230 is included in the GUI 200. The drop down menu includes a both option 232, a planned event flag option 234, and a without planned event flag option 236. One of ordinary skill in the art would understand that the drop down menu for the planned event flag filter 230 is not limited to only the options included in FIG. 2. The GUI 200 indicates that the both option 232 is selected meaning that all alarms will be aggregated regardless of whether the component is expected to undergo servicing.

Using the GUI 200, the network manager is able to select criteria for generating the alarm data configuration information. These criteria allow the network manager to focus analysis on alarms that fall within a scope of a monitoring agreement, an area of concern for the network, key components within the network, or other suitable alarms. By limiting the amount of alarm data provided to the network manager, or analyzed by a system, e.g., system 100 (FIG. 1), a risk of failing to identify trends in the alarm data is reduced in comparison with other approaches.

Figure 3:
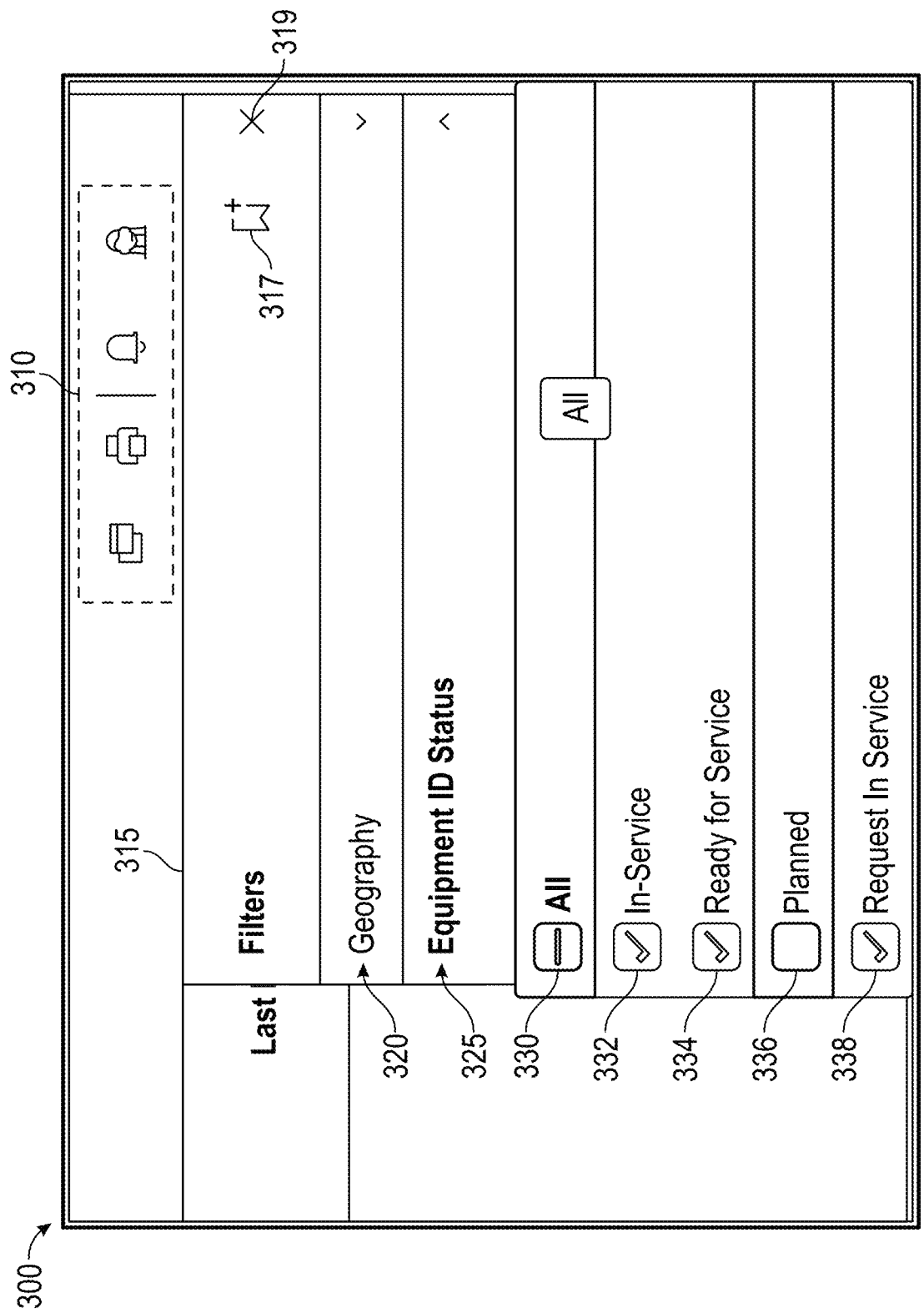
FIG. 3 is a view of a GUI for configuring tracked alarm data in accordance with some embodiments.

FIG. 3 is a view of a GUI for configuring tracked alarm data in accordance with some embodiments. In some embodiments, the GUI 300 is generated using the system 100 (FIG. 1), the system 900 (FIG. 9), or another suitable system. In some embodiments, the GUI 300 is usable to receive alarm data configuration information, such as through application 105 (FIG. 1). In some embodiments, the GUI 300 is part of the GUI 135 (FIG. 1).

The GUI 300 includes operational icons 310 and filters 315. The operational icons 310 allow the network manager to implement functionalities of the GUI 300 other than inputting alarm data configuration information. The filters 315 permit the network manager to enter criteria related to alarm data configuration information.

The operational icons 310 are similar to the operational icons 210 discussed above with respect to GUI 200 (FIG. 2). The operational icons 310 are not discussed in detail for the sake of brevity.

The filters 315 is a window for displaying criteria for setting alarm data configuration information. The filters 315 include a bookmark icon 317 for bookmarking the criteria being set; and a close icon 319 for closing the filters 315. The bookmark icon 317 and the close icon 319 are similar to the bookmark icon 217 and the close icon 219 respectively. The bookmark icon 317 and the close icon 319 are not discussed in detail for the sake of brevity.

The filters 315 further include a geography filter 320 and an equipment ID status filter 325. In some embodiments, the filters 315 include additional filters from those included in FIG. 3. In some embodiment, at least one of the filters in the filters 315 is omitted or replaced with a different filter from those included in FIG. 3. One of ordinary skill in the art would understand that this description is not limited to solely the filters included in FIG. 3. Each of the geography filter 320, and the equipment ID status 325 include a drop down menu to permit selection options for each of the filters. In some embodiments, at least one of the geography filter 320, or the equipment ID status filter 325 is able to receive alphanumeric information. In some embodiments, the drop down menus of the filters 315 are automatically populated by the GUI 300 based on available options for the network. In some embodiments, the available options for the network are determined based on an inventory database (not shown).

The geography filter 320 is similar to the geography filter 220 and will not be discussed in detail for the sake of brevity.

The equipment ID status filter 325 is similar to the equipment ID status filter 225. In comparison with the equipment ID status filter 225, the equipment ID status filter 325 includes an expanded drop down menu. The drop down menu for the equipment ID status filter 325 includes an all option 230, an in service option 232, a ready for service option 334, a planned option 336 and a request in service option 338. One of ordinary skill in the art would understand that the drop down menu for the equipment ID status filter 325 is not limited to only the options included in FIG. 3. The GUI 300 indicates that the in service option 332, the ready for service option 334 and the request in service option 338 are selected meaning that all alarms for components falling within any of the selected service categorizes will be aggregated. The all option 330 indicates that all components within the network are included regardless of whether the component is currently in service. The in service option 332 indicates that the component is currently in operation and impacting functionality of the network. The ready for service option 334 indicates that the component is installed, but not yet in a condition for be brought into service. For example, the component is installed, but less than all components of the node are installed. The planned option 336 indicates that the component is not yet fully installed or otherwise not ready to be brought into service. The request in service option 338 indicates that the component is not currently in service, but is ready to be brought into service.

Using the GUI 300, the network manager is able to select criteria for generating the alarm data configuration information. These criteria allow the network manager to focus analysis on alarms that fall within a scope of a monitoring agreement, an area of concern for the network, key components within the network, or other suitable alarms. By limiting the amount of alarm data provided to the network manager, or analyzed by a system, e.g., system 100 (FIG. 1), a risk of failing to identify trends in the alarm data is reduced in comparison with other approaches.

Figure 4:
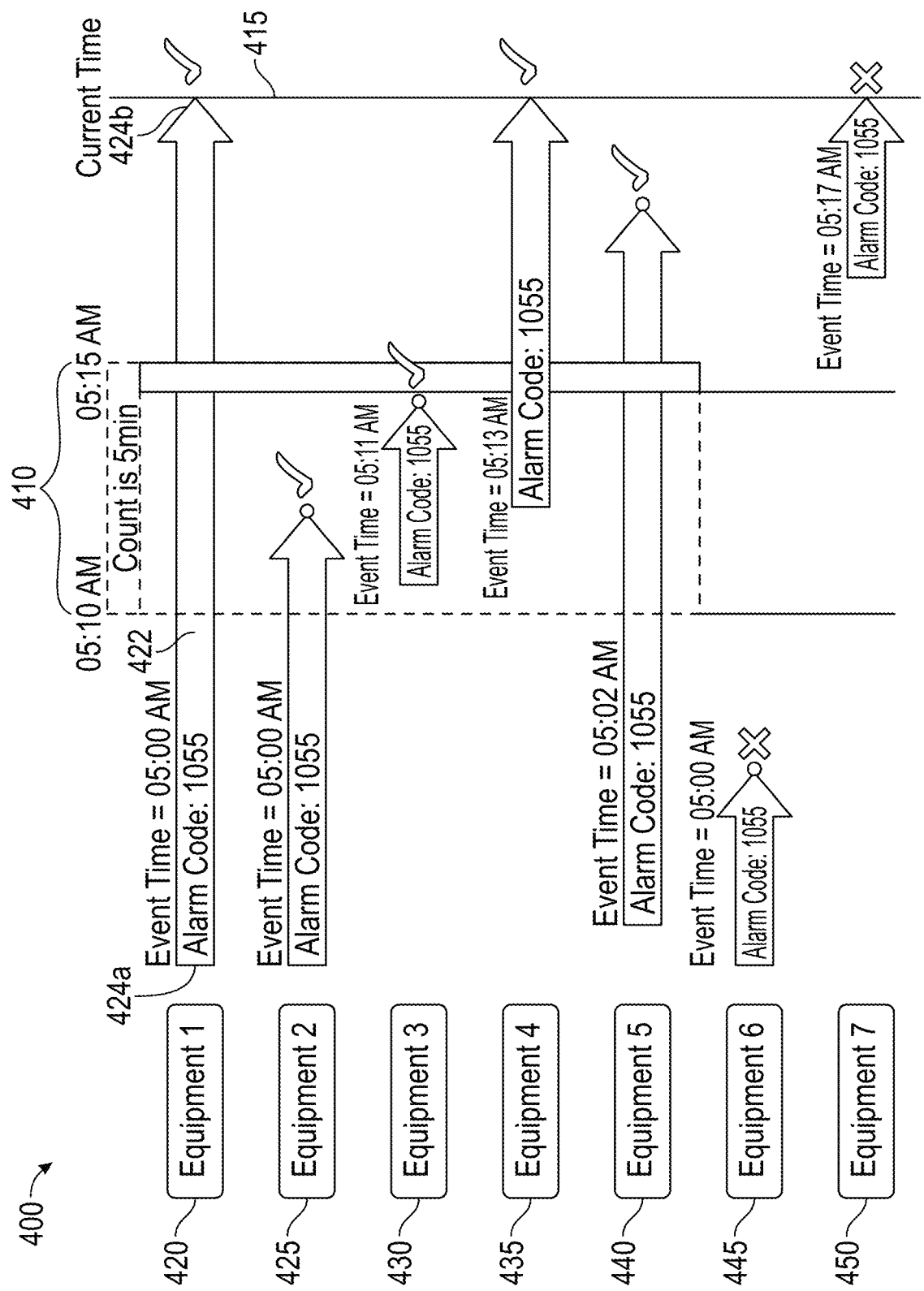
FIG. 4 is a view of a graphical representation for determining whether alarm data is aggregated based on configured tracked alarm data in accordance with some embodiments.

FIG. 4 is a view of a graphical representation 400 for determining whether alarm data is aggregated based on configured tracked alarm data in accordance with some embodiments. In some embodiments, the graphical representation 400 is usable by the data processing service 120 to aggregate alarm data based on alarm data from the database 115 and alarm data configuration information from the configuration data storage 110 (FIG. 1). One of ordinary skill in the art would understand that the graphical representation 400 is provided to assist in understanding a time frame, but that the current disclosure is not limited to the details provided in the graphical representation 400.

The graphical representation 400 includes a time frame 410, a current time 415, a plurality of equipment IDS 420-450, and a corresponding plurality of alarms. For the sake of brevity, only the alarm 422 for the equipment 1 420 is labeled. One of ordinary skill in the art would understand that the description of the alarm 422 is also applicable to the alarms for the other equipment IDs 425-450.

The time frame 410 in the graphical representation 400 is five minutes, including four minutes of alarm data gathering and one minute of alarm data processing. One of ordinary skill in the art would recognize that the duration of this time frame 410 is merely exemplary and not intended to limit the scope of this description. The graphical representation 400 includes the alarm 422 beginning 424a at a time of 5:00 AM, prior to the beginning of the time frame 410, and extending to a time 424b equal to a current time 415 after the time frame 410. Since the alarm 422 is still active at the current time 415, the alarm 422 is likely unresolved at the current time 415. Since the alarm 422 was pending for at least a portion of the time frame 410, the alarm 422 will be included in any aggregation performed for the time frame 410 if the alarm 422 matches filter criteria, e.g., input into GUI 200 (FIG. 2) or GUI 300 (FIG. 3), for aggregation.

An alarm for the equipment 2 425 begins prior to the time frame 410 and ends during the time frame 410. Since the alarm for the equipment 2 425 was pending for at least a portion of the time frame 410, the alarm for the equipment 2 425 will be including in any aggregation performed for the time frame 410 if the alarm for the equipment 2 425 matches filter criteria for aggregation.

An alarm for the equipment 3 430 begins during the time frame 410 and ends during the time frame 410. Since the alarm for the equipment 3 430 was pending for at least a portion of the time frame 410, the alarm for the equipment 3 430 will be including in any aggregation performed for the time frame 410 if the alarm for the equipment 3 430 matches filter criteria for aggregation.

An alarm for the equipment 4 435 begins during the time frame 410 and ends after the time frame 410. Since the alarm for the equipment 4 435 was pending for at least a portion of the time frame 410, the alarm for the equipment 4 435 will be including in any aggregation performed for the time frame 410 if the alarm for the equipment 4 435 matches filter criteria for aggregation.

An alarm for the equipment 5 440 begins prior to the time frame 410 and ends after the time frame 410. Since the alarm for the equipment 5 440 was pending for at least a portion of the time frame 410, the alarm for the equipment 5 440 will be including in any aggregation performed for the time frame 410 if the alarm for the equipment 5 440 matches filter criteria for aggregation.

An alarm for the equipment 6 445 begins prior to the time frame 410 and ends prior to the time frame 410. Since the alarm for the equipment 6 445 was not pending for at least a portion of the time frame 410, the alarm for the equipment 6 445 will not be including in any aggregation performed for the time frame 410 regardless of whether the alarm for the equipment 6 445 matches filter criteria for aggregation.

An alarm for the equipment 7 450 begins after the time frame 410 and ends after the time frame 410. Since the alarm for the equipment 7 450 was not pending for at least a portion of the time frame 410, the alarm for the equipment 7 450 will not be including in any aggregation performed for the time frame 410 regardless of whether the alarm for the equipment 7 450 matches filter criteria for aggregation.

Figure 5:
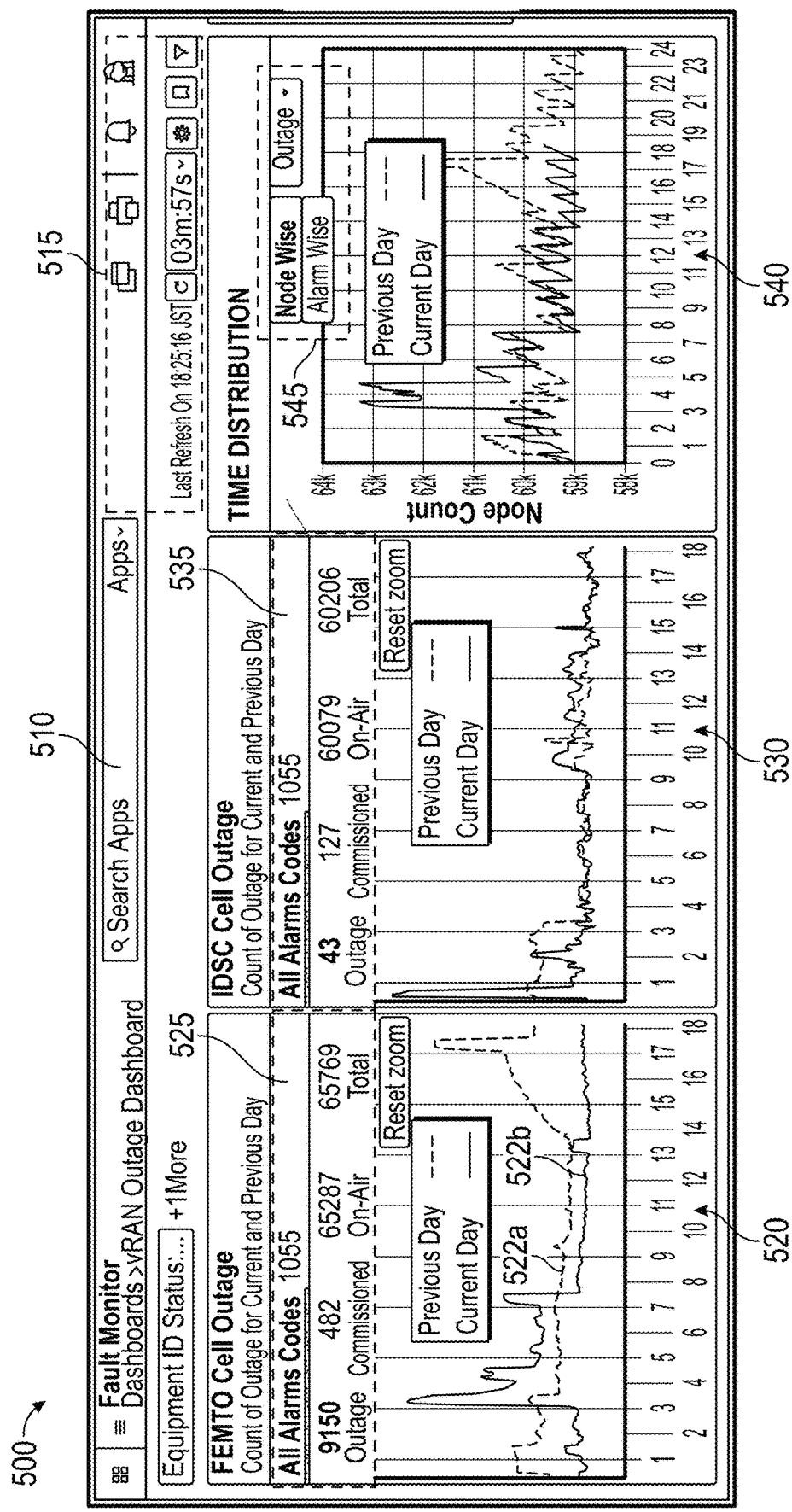
FIG. 5 is a view of a GUI including graphical representations of tracked alarm data from a current day and a previous day in accordance with some embodiments.

FIG. 5 is a view of a GUI 500 including graphical representations of tracked alarm data from a current day and a previous day in accordance with some embodiments. In some embodiments, the GUI 500 is usable as the GUI 135 (FIG. 1). In some embodiments, the GUI 500 is also usable as the application 105 (FIG. 1). In some embodiments, the GUI 500 is generated using the system 100 (FIG. 1), the system 900 (FIG. 9), or another suitable system.

The GUI 500 includes a search bar 510 to allow searching for information in the GUI 500 or additional information. The GUI 500 further includes operational icons 515 for implementing functionalities of the GUI 500. The GUI 500 further includes a first graph 520 indicating a number of alarms for a FEMTO cell outages both in a current day and a previous day. For the sake of this description, the previous day means the day immediately precedent to the current day. A first display 525 accompanies the first graph 520. The first display 525 provides summary data information corresponding to the first graph 520. The GUI 500 further includes a second graph 530 indicating a number of alarms for data center (IDSC) cell outages both in a current day and a previous day. A second display 535 accompanies the second graph 530. The second display 535 provides summary data information corresponding to the second graph 530. The GUI 500 further includes a third graph 540 including a time distribution of outages for nodes within the network. A third display 545 indicates options for selectively adjusting the data displayed in the third graph 540.

The search bar 510 provides an opportunity for the network manager to selectively search for information on the GUI 500 or additional information not currently displayed in the GUI 500. Including the ability to search the GUI 500 using the search bar 510 helps to allow the network manager to further research identified trends as well as compare a wider range of data to help identify potential trends or causes of trends in the alarm data. The search bar 510 is configured to receive alphanumeric information from the network manager. In some embodiments, the search bar 510 includes a drop down menu to allow the network manager to filter a search field for a search resulting from information being input into the search bar 510.

The operational icons 515 are similar to the operational icons 210 (FIG. 2). The operational icons 515 are not discussed in detail for the sake of brevity.

The first graph 520 includes line graphs indicating a number of alarms having an alarm code 1055 for monitored FEMTO cells at different times. The first line graph 522a indicates a number of alarms in the previous day. The second line graph 522b indicates a number of alarms from the previous day. By comparing the first line graph 522a with the second line graph 522b, the network manager is able to determine whether the number of alarms experienced by the FEMTO cells is significantly different from a normal amount of alarms. In some embodiments, a system, such as the system 100 (FIG. 1) or the system 900 (FIG. 9), implementing the GUI 500 is automatically identifies significant differences between the alarms from the previous day and alarms from the current day. For example, in some embodiments, the system is configured to generate a notification in response the second line graph 522b being different from the first line graph 522a at a certain time frame by a threshold value. In some embodiments, the threshold value ranges from two standard deviations to six standard deviations. In some embodiments, the threshold value ranges from a 50% difference to a 200% different. If the threshold value is too low, then a risk of overwhelming the network manager with notifications increases, in some instances. If the threshold value is too high, then a risk of failing to identify a trend increases, in some instances. In some embodiments, the notification includes an audio or visual notification. In some embodiments, the notification is transmitted to a mobile device accessible by the network manager. In some embodiments, the notification is transmitted wirelessly. In some embodiments, the notification is transmitted via wired connection. In some embodiments, the notification includes a recommended solution to the network manager. In some embodiments, the recommended solution includes dispatching a maintenance crew to the location of the FEMTO cell; remotely accessing and repairing the FEMTO cell; restarting the FEMTO cell; or another suitable recommended solution.

In addition to displaying the alarm data as line graphs, the network manager is able to select any data point along either the first line graph 522a or the second line graph 522b to display alarm data at that specific point in time. In some embodiments, the network manager is able to apply additional filters to the data displayed as a result of selecting a data point. For example, in some embodiments, the network manager is able to apply a filter to remove components that are not currently in service to determine whether an increase of the number of alarms is impacting customers of the network. In some embodiments, the network manager is able to obtain more detailed information about the alarms by selecting a data point, such as whether nodes in different data centers are down. This ability to display additional information at specific data points allows the network manager to specifically identify whether a trend in the alarm data warrants expedited intervention. For example, in some embodiments, the network manage is able to access the detailed information for alarm data at a specific time and determine that an increase in alarm data is a result of planned outages for several locations. By having this additional information, the network manager is able to avoid sending instructions to a maintenance crew, or remotely accessing the components, to attempt to resolve an issue that is already being addressed. Thus, the GUI 500 helps to improve efficiency in network monitoring and maintenance in comparison with other approaches.

The first display 525 is associated with the first graph 520 and provides live data indicating alarm data at a present time for the FEMTO cells. The first display 525 indicates a number of current outages as 9150; a number of commissioned, i.e., planned, cells as 482; a number of on-air, i.e., in service, cells as 65,287; and a total number of cells as 65,769. In some embodiments, the system implementing the GUI 500 is configured to automatically generate a notification in response to the number of outages reaching a predetermined percentage of on-air cells or total cells. In some embodiments, the notification is implemented as discussed above. By generating notifications based on the number of outages, the system is able to help the network manager in maintaining a satisfactory experience for customers of the network. In some embodiments, the first display 525 provides information related to a most recent data point of the second line graph 522b. In some embodiments, the first display 525 provides information corresponding to a most recent collected set of alarm data regardless of whether the collected set of alarm data corresponds to the most recent data point of the second line graph 522b.

The first graph 520 includes two line graphs. However, one of ordinary skill in the art would understand that the current application is not limited to only two line graphs. For example, in some embodiments, the first graph 520 includes a third line graph including average data for a past seven days of the network. The first line graph 522a indicates alarm data from the previous day. However, one of ordinary skill in the art would understand that the current application not limited to this specific type of data. In some embodiments, the first line graph 522a includes data corresponding to an average of alarm data from the past three days.

The second graph 530 is similar to the first graph 520. In comparison with the first graph 520, the second graph 530 provides data related to IDSC cells instead of FEMTO cells. Functionality of the second graph 530 is similar to the functionality of the first graph 520 and is not explained in detail for the sake of brevity.

The second display 535 is similar to the first display 525. In comparison with the first display 525, the second display 535 provides data related to IDSC cells instead of FEMTO cells. Functionality of the second display 535 is similar to the functionality of the first display 525 and is not explained in detail for the sake of brevity.

The third graph 540 includes time distribution information for outages based on nodes. As indicated in the third display 545, the "node wise" option is selected. Additionally, the "outage" option is selected. As a result, the third graph 540 displays data related to nodes experiencing an outage at various times in the current day as well as the previous day. The network manager is able to select different options from the third display 545 to adjust the data included in the third graph 540. For example, in some embodiments, the network manager selects the "alarm wise" option to display a total number of alarms, not just nodes, indicating an outage. By providing an ability to selectively refine and adjust the data displayed to the network manager, efficiency in the maintenance of the network is improved in comparison with approaches that provide static data to the network manager to sift through. Other functionalities of the third graph 540 are similar to those described above with respect to the first graph 520 and are not repeated here for the sake of brevity.

Figure 6:
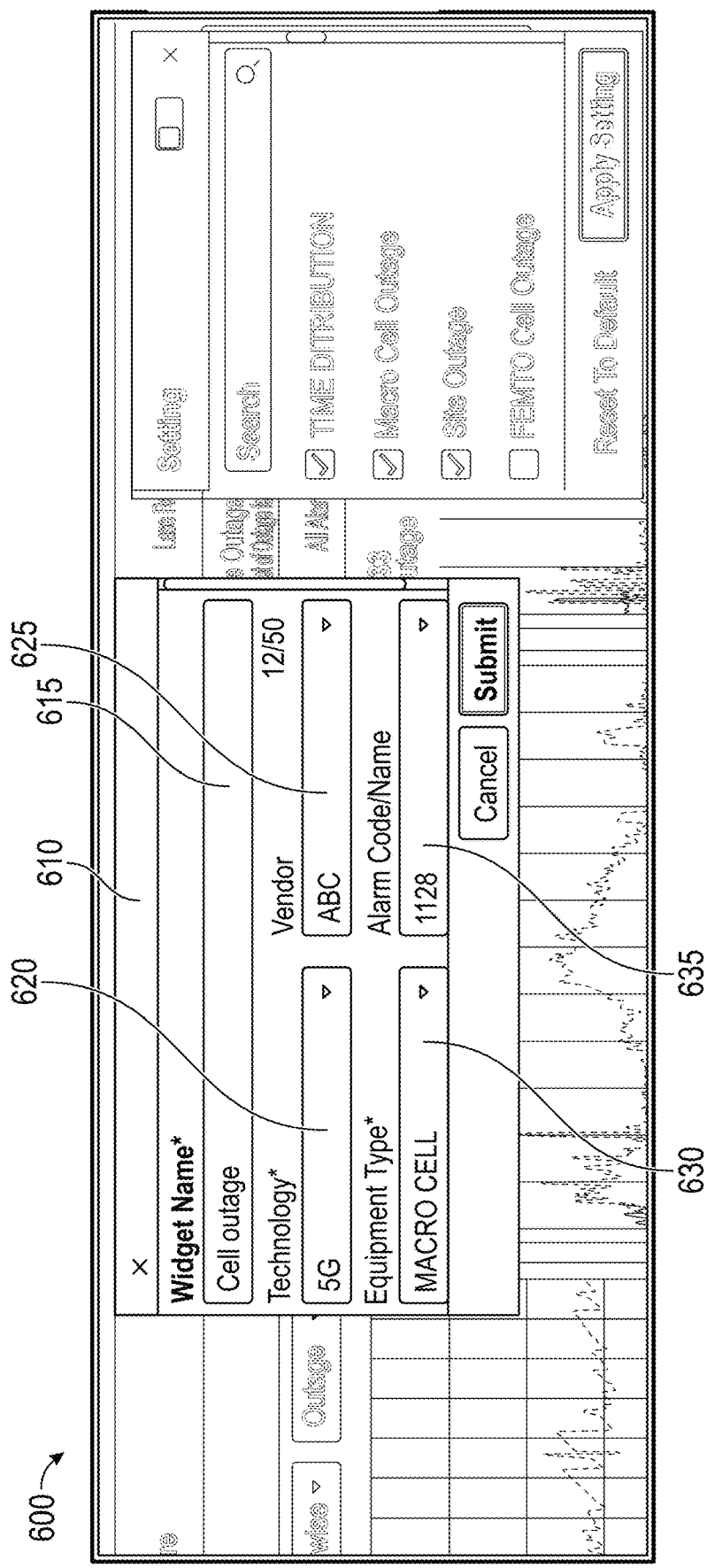
FIG. 6 is a view of a GUI including a window for analyzing tracked alarm data in accordance with some embodiments.

FIG. 6 is a view of a GUI 600 including a window for analyzing tracked alarm data in accordance with some embodiments. In some embodiments, the GUI 600 is usable as the GUI 135 (FIG. 1). In some embodiments, the GUI 600 is also usable as the application 105 (FIG. 1). In some embodiments, the GUI 600 is generated using the system 100 (FIG. 1), the system 900 (FIG. 9), or another suitable system. In some embodiments, the GUI 600 is displayed in response to selecting of a data point in a graph, such as second line graph 522b of the GUI 500 (FIG. 5).

The GUI 600 includes a window 610 displayed overlaying one or more graphs. The window 610 includes a name field 615 for receiving a name for a combination of criteria for sorting alarm data, hereinafter called a widget name. The window 610 further includes a technology field 620 for receiving information on a type of technology that will be monitored by the widget. The window 610 further includes a vendor name 625 for receiving information on a vendor that will be monitored by the widget. The window 610 further includes an equipment type field 630 for receiving information on a type of equipment that will be monitored by the widget. The window 610 further includes an alarm code/name field 635 for receiving information on the types of alarms that will be monitored by the widget. The window 610 further includes cancel and submit buttons. The cancel button discontinues configuration of the widget. The submit button implements the widget for aggregating and displaying alarm data.

The widget name field 615 is configured to receive alphanumeric information for naming the widget. The network manager is able to name the widget using the widget name field 615 to allow easy retrieval of configurations for alarm data processing. By storing multiple widgets, the system implementing the GUI 600 is able to allows the network manager to selectively navigate through more widgets than could be meaningfully displayed on a single screen.

The technology field 620 is configured to receive information from the network manager indicating a type of technology to be monitored. In some embodiments, the technology field 620 includes a drop down menu of technology options, such as 5G, LTE, etc., available on the network. In some embodiments, the options within the drop down menu are automatically populated based on an inventory database (not shown) for the network. In some embodiments, the technology field 620 is configured to receive alphanumeric information from the network manager. Offering the ability to focus network monitoring on specific technologies helps the network manager to prioritize monitoring activities on technologies deemed to be most important. For example, customers paying for 5G service expect high network quality. By tailoring an alarm data configuration to monitor only 5G technology, the network manager is able to help ensure that these customers receive the expected network quality, in contrast with customers that utilize older technologies of the network.

The vendor field 625 is configured to receive information from the network manager indicating a company responsible for maintaining the network. In some embodiments, the vendor field 625 includes a drop down menu of vendor options. In some embodiments, the vendor field 625 is configured to receive alphanumeric information from the network manager. In some embodiments, the network manager will be responsible for monitoring networks for several companies; or maintenance of different portions of a network will be contracted to different companies. By allowing the network manager to focus the alarm data analysis to specific vendors, the network manager is able to provide repair/replace instructions to the correct vendor. Additionally, in some embodiments, the network manager is only responsible for monitoring alarms for specific companies. By allowing the network manager to focus the alarm data analysis to only the companies for which the network manager is responsible helps to avoid the network manager performing unnecessary tasks, which improves overall work efficiency for maintenance of the network.

The equipment type field 630 is configured to receive information from the network manager indicating a type of equipment to be monitored. In some embodiments, the equipment type field 630 includes a drop down menu of technology options, such as macro cell, femto cell, IDSC, etc., available on the network. In some embodiments, the options within the drop down menu are automatically populated based on an inventory database (not shown) for the network. In some embodiments, the equipment type field 630 is configured to receive alphanumeric information from the network manager. Offering the ability to focus network monitoring on specific equipment types helps the network manager to prioritize monitoring activities on equipment deemed to be most important. For example, some pieces of equipment lack redundant systems or are more likely to cause alarms in other components of the network. By monitoring these high priority equipment types in a preferential manner, the network manager is able to improve efficiency in the network maintenance.

The alarm code/name field 635 is configured to receive information from the network manager indicating a type of alarm to be monitored. In some embodiments, the alarm code/name field 635 includes a drop down menu of alarm options, such as outage, loss of connectivity, etc., available on the network. In some embodiments, the options within the drop down menu are automatically populated based on an alarm database, such as database 115 (FIG. 1) for the network. In some embodiments, the alarm code/name field 635 is configured to receive alphanumeric information from the network manager. Offering the ability to focus network monitoring on specific alarm types helps the network manager to prioritize monitoring activities on alarms deemed to be most important. For example, alarms such as outages have a greater immediate impact on customers of the network than alarms related to memory capacity. By prioritizing the monitoring of alarms codes, the network manager is able to help maintain customer satisfaction with the network. In some embodiments, the alarm code/name field 635 is configured to receive multiple alarm codes/names. In some embodiments, the alarm code/name field 635 is configured to receive a single alarm code/name.

Using the GUI 600, the network manager is able to create new widgets for monitoring the network. The ability to create new widgets allows the network manager the flexibility to adjust to new requests for monitoring services and to improve monitoring efficiency. Improving monitoring efficiency in turn helps to improve performance of the network by quickly identifying and resolving problems or errors having a greatest impact on the performance of the network.

Figure 7:
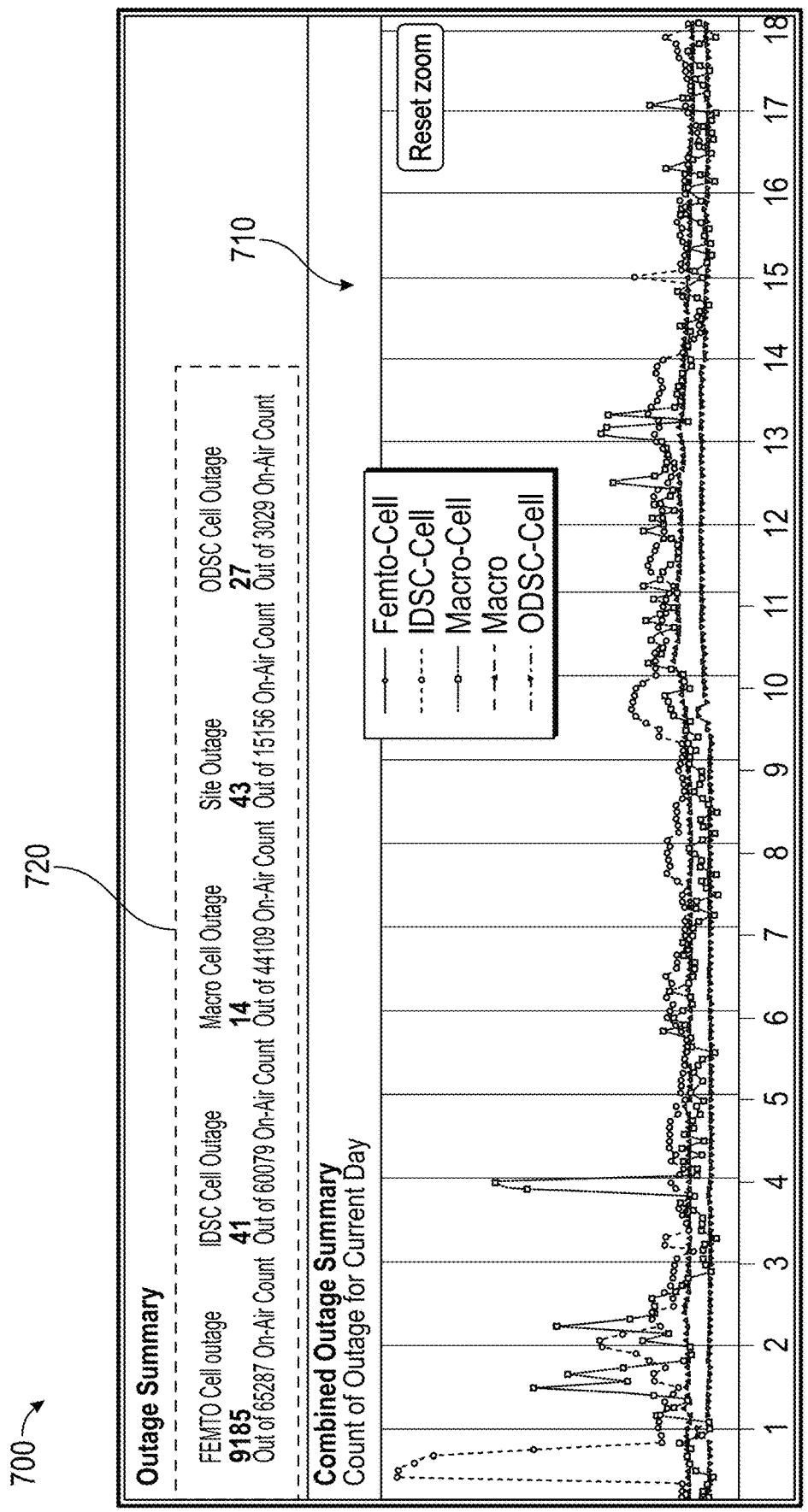
FIG. 7 is a view of a GUI including a graphical representation of tracked alarm data from a plurality of configured tracked alarm data sets in accordance with some embodiments.

FIG. 7 is a view of a GUI 700 including a graphical representation of tracked alarm data from a plurality of configured tracked alarm data sets in accordance with some embodiments. In some embodiments, the GUI 700 is usable as the GUI 135 (FIG. 1). In some embodiments, the GUI 700 is also usable as the application 105 (FIG. 1). In some embodiments, the GUI 700 is generated using the system 100 (FIG. 1), the system 900 (FIG. 9), or another suitable system. In some embodiments, the GUI 700 is combined with the GUI 500 (FIG. 5). In some embodiments, the GUI 700 is separate from the GUI 500 (FIG. 5).

The GUI 700 includes a graph 710 including multiple line graphs. The GUI 700 further includes a display 720. The graph 710 includes outages for a variety of different cell types.

The graph 710 includes outages for femto cells, IDSC cells, macro cells, sites, and open data services (ODSC) cells. One of ordinary skill in the art would understand that the cell types included in the graph 710 are exemplary and do not limit the scope of this description. In some embodiments, the graph 710 includes different types of cells from those included in FIG. 7. Functionality of the graph 710 is similar to the functionality of the first graph 520 (FIG. 5) described above and is not discussed in detail here for the sake of brevity.

The display 720 includes a summary of outages depicted in the graph 710. A number of outages for each type of cell along with the number of each type of cell currently on-air, i.e., in service, is listed in the display 720. Functionality of the display 720 is similar to the functionality of the first display 525 (FIG. 5) described above and is not discussed here in detail for the sake of brevity.

Using the GUI 700, the network manager is able to monitor alarms across numerous cell types in a single graph. The ability to view outages across a single graph allows the network manager the flexibility to quickly identify problems or errors within the network, which improves monitoring efficiency.

FIG. 8 is a view of a table 800 of tracked alarm data in accordance with some embodiments. In some embodiments, the table 800 is displayed as part of the GUI 135 (FIG. 1). In some embodiments, the table 800 is generated using the system 100 (FIG. 1), the system 900 (FIG. 9), or another suitable system. In some embodiments, the table 800 is combined with one or more of the GUI 700 or the GUI 500 (FIG. 5). In some embodiments, the table 800 is separate from both the GUI 700 and the GUI 500 (FIG. 5).

The table 800 helps to organize alarm data for review by the network manager. Columns of the table 800 are selectable by the network manager, e.g., using the system 100 (FIG. 1), the system 900 (FIG. 9), or the GUI 600 (FIG. 6). The columns of the table 800 include filters 810, which are capable of being customized by the network manager, as described above. The table 800 includes a time 820, which is a time at which the alarm data was initially generated by the component of the network. The filters 810 listed in table 800 are merely exemplary and one of ordinary skill in the art would recognize that the current description is not limited to only the filters 810 in FIG. 8. One of ordinary skill in the art would also recognize that the filters 810 in FIG. 8 are also usable as fields for defining alarm data configuration information, such as described with respect to the application 105 (FIG. 1). The table 800 further includes key parameter indicators (KPI) 845. The KPI 845 indicate a number of each type of component that satisfies the criteria of the filters 810 in a corresponding row of the table 800.

The filters 810 include a geography name 825. The geography name 825 is usable to determine a geographic location of the component generating the alarm. The filters 810 further include a device/service type 830. The device/service type 830 describes an equipment type of the component generating the alarm. While FIG. 8 includes only macro cell outage as an example, one of ordinary skill in the art would recognize that other examples are also contemplated, such as femto cell, IDSC, etc. The filters 810 further includes a device/service ID status 835. The device/service ID status 835 indicates a status of the component within the network, e.g., in service, planned, etc. The filters 810 further include an alarm code 840. The alarm code 840 indicates one or more types of alarms that are used aggregate the alarms in table 900.

The KPI 845 include a device/service count 850 indicating a number of pieces of equipment that have alarms that satisfy the criteria of the filters 810. A non-limiting example of aggregation of equipment is provided in FIG. 4. The KPI 845 further include a device/service count due to planned activity 855 which indicates how many of the alarms generated are associated with equipment that has a planned activity to be performed on the equipment at the time of the alarm. The KPI 845 further include a device/service count without any planned activity 860 which indicates how many of the alarms generated are associate with equipment that does not have a planned activity to be performed on the equipment at the time of the alarm.

Using the table 800, the network manager is able to monitor alarms and determine how many alarms result from different combinations of filters and how many alarms are a result of planned activity. The ability to view the alarms in a single table allows the network manager the flexibility to quickly identify problems or errors within the network, which improves monitoring efficiency.

FIG. 9 is a schematic view of an alarm trend determination and notification system 900 in accordance with some embodiments. In some embodiments, the system 900 is usable as the system 100 (FIG. 1). In some embodiments, the system 900 is usable to generate the GUI 200 (FIG. 2), the GUI 300 (FIG. 3), the GUI 500 (FIG. 5), the GUI 600 (FIG. 6), the GUI 700 (FIG. 7), the table 800 (FIG. 8), or other suitable GUIs or tables.

The system 900 includes a hardware processor 902 and a non-transitory, computer readable storage medium 904 encoded with, i.e., storing, the computer program code 906, i.e., a set of executable instructions. Computer readable storage medium 904 is also encoded with instructions 907 for interfacing with external devices. The processor 902 is electrically coupled to the computer readable storage medium 904 via a bus 908. The processor 902 is also electrically coupled to an I/O interface 910 by bus 908. A network interface 912 is also electrically connected to the processor 902 via bus 908. Network interface 912 is connected to a network 914, so that processor 902 and computer readable storage medium 904 are capable of connecting to external elements via network 914. The processor 902 is configured to execute the computer program code 906 encoded in the computer readable storage medium 904 in order to cause system 900 to be usable for performing a portion or all of the operations as described in the system 100 (FIG. 1), or for generating the GUI 200 (FIG. 2), the GUI 300 (FIG. 3), the GUI 500 (FIG. 5), the GUI 600 (FIG. 6), the GUI 700 (FIG. 7), or the table 800 (FIG. 8).

In some embodiments, the processor 902 is a central processing unit (CPU), a multi-processor, a distributed processing system, an application specific integrated circuit (ASIC), and/or a suitable processing unit.

In some embodiments, the computer readable storage medium 904 is an electronic, magnetic, optical, electromagnetic, infrared, and/or a semiconductor system (or apparatus or device). For example, the computer readable storage medium 904 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 904 includes a compact disk-read only memory (CD-ROM), a compact disk-read/write (CD-R/W), and/or a digital video disc (DVD).

In some embodiments, the storage medium 904 stores the computer program code 906 configured to cause system 900 to perform portion or all of the operations as described in the system 100 (FIG. 1), or for generating the GUI 200 (FIG. 2), the GUI 300 (FIG. 3), the GUI 500 (FIG. 5), the GUI 600 (FIG. 6), the GUI 700 (FIG. 7), or the table 800 (FIG. 8). In some embodiments, the storage medium 904 also stores information used for performing a portion or all of the operations as described in the system 100 (FIG. 1), or for generating the GUI 200 (FIG. 2), the GUI 300 (FIG. 3), the GUI 500 (FIG. 5), the GUI 600 (FIG. 6), the GUI 700 (FIG. 7), or the table 800 (FIG. 8) as well as information generated during performing portion or all of the operations as described in the system 100 (FIG. 1), or for generating the GUI 200 (FIG. 2), the GUI 300 (FIG. 3), the GUI 500 (FIG. 5), the GUI 600 (FIG. 6), the GUI 700 (FIG. 7), or the table 800 (FIG. 8). In some embodiments, the information includes information such as an alarm code parameter 916, a geography parameter 918, a status ID parameter 920, an aggregation time period parameter 922, and/or a set of executable instructions to perform a portion or all of the operations as described in the system 100 (FIG. 1), or for generating the GUI 200 (FIG. 2), the GUI 300 (FIG. 3), the GUI 500 (FIG. 5), the GUI 600 (FIG. 6), the GUI 700 (FIG. 7), or the table 800 (FIG. 8).

In some embodiments, the storage medium 904 stores instructions 907 for interfacing with external devices. The instructions 907 enable processor 902 to generate instructions readable by the external devices to effectively implement a portion or all of the operations as described in the system 100 (FIG. 1), or for generating the GUI 200 (FIG. 2), the GUI 300 (FIG. 3), the GUI 500 (FIG. 5), the GUI 600 (FIG. 6), the GUI 700 (FIG. 7), or the table 800 (FIG. 8).

System 900 includes I/O interface 910. I/O interface 910 is coupled to external circuitry. In some embodiments, I/O interface 910 includes a keyboard, keypad, mouse, trackball, trackpad, and/or cursor direction keys for communicating information and commands to processor 902.

System 900 also includes network interface 912 coupled to the processor 902. Network interface 912 allows system 900 to communicate with network 914, to which one or more other computer systems are connected. Network interface 912 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described in the system 100 (FIG. 1), or for generating the GUI 200 (FIG. 2), the GUI 300 (FIG. 3), the GUI 500 (FIG. 5), the GUI 600 (FIG. 6), the GUI 700 (FIG. 7), or the table 800 (FIG. 8) is implemented in two or more systems 900, and information is exchanged between different systems 900 via network 914.

An aspect of this description relates to a system for aggregating alarms for a network. The system includes a non-transitory computer readable medium configured to store instructions thereon. The system further includes a processor connected to the non-transitory computer readable medium. The processor is configured to execute the instructions for receiving information for configuring alarm data. The processor is configured to execute the instructions for aggregating alarm data based on the information for configuring alarm data. The processor is configured to execute the instructions for generating a visual representation of the aggregated alarm data. The processor is configured to execute the instructions for instructing a display to display the visual representation on a graphical user interface (GUI). The processor is configured to execute the instructions for receiving filter criteria through the GUI. The processor is configured to execute the instructions for updating the display on the GUI based on the filter criteria. In some embodiments, the processor is further configured to execute the instructions for generating the visual representation including aggregate alarm data from a current day and aggregated alarm data prior to the current day. In some embodiments, the processor is further configured to execute the instructions for automatically generating a notification in response to a different between aggregated alarm data for a first time of the current day and aggregated alarm data for a second time prior to the current day exceeding a threshold. In some embodiments, the processor is further configured to execute the instructions for aggregating the alarm data based on a time frame, wherein every alarm that is pending during the time frame and satisfies the information for configuring alarm data is aggregated. In some embodiments, the processor is further configured to execute the instructions for generating the visual representation including at least one graph and at least one table. In some embodiments, the processor is further configured to execute the instructions for receiving information for configuring alarm data including at least one of geography information, alarm code information, equipment type information, equipment status information, or planned event information. In some embodiments, the processor is further configured to execute the instructions for storing the aggregated alarm data in a cloud storage.

An aspect of this description relates to a method of aggregating alarms for a network. The method includes receiving information for configuring alarm data. The method further includes aggregating alarm data based on the information for configuring alarm data. The method further includes generating a visual representation of the aggregated alarm data. The method further includes displaying the visual representation on a graphical user interface (GUI). The method further includes receiving filter criteria through the GUI. The method further includes updating the display on the GUI based on the filter criteria. In some embodiments, generating the visual representation includes generating the visual representation including aggregate alarm data from a current day and aggregated alarm data prior to the current day. In some embodiments, the method further includes automatically generating a notification in response to a different between aggregated alarm data for a first time of the current day and aggregated alarm data for a second time prior to the current day exceeding a threshold. In some embodiments, aggregating the alarm data includes aggregating the alarm data based on a time frame, wherein every alarm that is pending during the time frame and satisfies the information for configuring alarm data is aggregated. In some embodiments, generating the visual representation includes generating the visual representation including at least one graph and at least one table. In some embodiments, receiving information for configuring alarm data includes receiving at least one of geography information, alarm code information, equipment type information, equipment status information, or planned event information. In some embodiments, the method further includes storing the aggregated alarm data in a cloud storage.

An aspect of this description relates to a non-transitory computer readable medium for storing instructions thereon. When executed by a processor, the instructions cause the processor to receive information for configuring alarm data. When executed by the processor, the instructions further cause the processor to aggregate alarm data based on the information for configuring alarm data. When executed by the processor, the instructions further cause the processor to generate a visual representation of the aggregated alarm data. When executed by the processor, the instructions further cause the processor to instruct a display to display the visual representation on a graphical user interface (GUI). When executed by the processor, the instructions further cause the processor to receive filter criteria through the GUI. When executed by the processor, the instructions further cause the processor to update the display on the GUI based on the filter criteria. In some embodiments, the instructions are further configured to cause the processor to generate the visual representation including aggregate alarm data from a current day and aggregated alarm data prior to the current day. In some embodiments, the instructions are further configured to cause the processor to automatically generate a notification in response to a different between aggregated alarm data for a first time of the current day and aggregated alarm data for a second time prior to the current day exceeding a threshold. In some embodiments, the instructions are further configured to cause the processor to aggregate the alarm data based on a time frame, wherein every alarm that is pending during the time frame and satisfies the information for configuring alarm data is aggregated. In some embodiments, the instructions are further configured to cause the processor to receive information for configuring alarm data comprising at least one of geography information, alarm code information, equipment type information, equipment status information, or planned event information. In some embodiments, the instructions are further configured to cause the processor to store the aggregated alarm data in a cloud storage.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system for aggregating alarms for a network, the system comprising:
    a non-transitory computer readable medium configured to store instructions thereon; and
    a processor connected to the non-transitory computer readable medium, wherein the processor is configured to execute the instructions for:
        receiving information for configuring alarm data;
        aggregating alarm data based on the information for configuring alarm data and a time frame, wherein every alarm that is pending during the time frame is aggregated and satisfies the information for configuring the alarm data is aggregated, and the time frame is a duration sufficient to complete receiving the alarm data and processing of the aggregated alarm data;
        generating a visual representation of the aggregated alarm data;
        instructing a display to display the visual representation on a graphical user interface (GUI);
        receiving filter criteria through the GUI; and
        updating the display on the GUI based on the filter criteria.

2. The system of claim 1, wherein the processor is further configured to execute the instructions for generating the visual representation including aggregate alarm data from a current day and aggregated alarm data prior to the current day.

3. The system of claim 2, wherein the processor is further configured to execute the instructions for automatically generating a notification in response to a difference between aggregated alarm data for a first time of the current day and aggregated alarm data for a second time prior to the current day exceeding a threshold.

4. The system of claim 1, wherein the processor is further configured to execute the instructions for generating an alert in response to failure to process all aggregated alarm data prior to receipt of a subsequent set of alarm data.

5. The system of claim 1, wherein the processor is further configured to execute the instructions for generating the visual representation including at least one graph and at least one table.

6. The system of claim 1, wherein the processor is further configured to execute the instructions for receiving information for configuring alarm data including at least one of geography information, alarm code information, equipment type information, equipment status information, or planned event information.

7. The system of claim 1, wherein the processor is further configured to execute the instructions for storing the aggregated alarm data in a cloud storage.

8. A method of aggregating alarms for a network, the method comprising:
receiving information for configuring alarm data;
aggregating alarm data based on the information for configuring alarm data and a time frame, wherein every alarm that is pending during the time frame is aggregated and satisfies the information for configuring the alarm data is aggregated, and the time frame is a duration sufficient to complete receiving the alarm data and processing of the aggregated alarm data;
generating a visual representation of the aggregated alarm data;
displaying the visual representation on a graphical user interface (GUI);
receiving filter criteria through the GUI; and
updating the display on the GUI based on the filter criteria.

9. The method of claim 8, wherein generating the visual representation comprises generating the visual representation including aggregate alarm data from a current day and aggregated alarm data prior to the current day.

10. The method of claim 9, further comprising automatically generating a notification in response to a difference between aggregated alarm data for a first time of the current day and aggregated alarm data for a second time prior to the current day exceeding a threshold.

11. The method of claim 8, further comprising generating an alert in response to failure to process all aggregated alarm data prior to receipt of a subsequent set of alarm data.

12. The method of claim 8, wherein generating the visual representation includes generating the visual representation including at least one graph and at least one table.

13. The method of claim 8, wherein receiving information for configuring alarm data comprises receiving at least one of geography information, alarm code information, equipment type information, equipment status information, or planned event information.

14. The method of claim 8, further comprising storing the aggregated alarm data in a cloud storage.

15. A non-transitory computer readable medium for storing instructions thereon, which when executed by a processor cause the processor to:
receive information for configuring alarm data;
aggregate alarm data based on the information for configuring alarm data and a time frame, wherein every alarm that is pending during the time frame is aggregated and satisfies the information for configuring the alarm data is aggregated, and the time frame is a duration sufficient to complete receiving the alarm data and processing of the aggregated alarm data;
generate a visual representation of the aggregated alarm data;
instruct a display to display the visual representation on a graphical user interface (GUI);
receive filter criteria through the GUI; and
update the display on the GUI based on the filter criteria.

16. The non-transitory computer readable medium of claim 15, wherein the instructions are further configured to cause the processor to generate the visual representation including aggregate alarm data from a current day and aggregated alarm data prior to the current day.

17. The non-transitory computer readable medium of claim 16, wherein the instructions are further configured to cause the processor to automatically generate a notification in response to a difference between aggregated alarm data for a first time of the current day and aggregated alarm data for a second time prior to the current day exceeding a threshold.

18. The non-transitory computer readable medium of claim 15, wherein the instructions are further configured to cause the processor to generate an alert in response to failure to process all aggregated alarm data prior to receipt of a subsequent set of alarm data.

19. The non-transitory computer readable medium of claim 15, wherein the instructions are further configured to cause the processor to receive information for configuring alarm data comprising at least one of geography information, alarm code information, equipment type information, equipment status information, or planned event information.

20. The non-transitory computer readable medium of claim 15, wherein the instructions are further configured to cause the processor to store the aggregated alarm data in a cloud storage.

* * * * *